US009237231B2

(12) United States Patent
Swanburg et al.

(10) Patent No.: US 9,237,231 B2
(45) Date of Patent: Jan. 12, 2016

(54) PROVIDING A PREDICTIVE RESPONSE FEATURE FOR MESSAGING APPLICATIONS BY ANALYZING THE TEXT OF A MESSAGE USING TEXT RECOGNITION LOGIC

(75) Inventors: Scott Swanburg, Duluth, GA (US); Andre Okada, Seattle, WA (US); Paul Hanson, Kirkland, WA (US); Chris Young, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/279,756

(22) PCT Filed: Mar. 24, 2008

(86) PCT No.: PCT/US2008/058067
§ 371 (c)(1),
(2), (4) Date: Jul. 27, 2010

(87) PCT Pub. No.: WO2008/118878
PCT Pub. Date: Oct. 2, 2008

(65) Prior Publication Data
US 2010/0287241 A1    Nov. 11, 2010

Related U.S. Application Data

(60) Provisional application No. 60/896,728, filed on Mar. 23, 2007.

(51) Int. Cl.
*G06F 11/00* (2006.01)
*G06F 15/16* (2006.01)
(Continued)

(52) U.S. Cl.
CPC .............. *H04M 3/493* (2013.01); *G06F 3/0489* (2013.01); *G06F 17/2705* (2013.01);
(Continued)

(58) Field of Classification Search
CPC ... H04L 61/1547; H04L 51/41; H04L 51/046; H04L 12/1818; H04L 51/18; H04L 51/02; H04M 3/42382; H04M 2203/2011; G06F 3/0489; G06F 17/30654; G06F 17/272; G06F 17/2705; G06Q 10/107
USPC ................ 709/206; 455/466; 705/12; 725/24
See application file for complete search history.

(56) References Cited

U.S. PATENT DOCUMENTS 4,930,077 A * 5/1990 Fan .................................. 704/8
5,341,414 A   8/1994 Popke
(Continued)

FOREIGN PATENT DOCUMENTS

EP    1359777    11/2003
EP    1569426    8/2005
(Continued)

OTHER PUBLICATIONS

U.S. Office Action dated Jul. 16, 2010 in U.S. Appl. No. 12/051,336.
(Continued)

*Primary Examiner* — Daniel C Murray
(74) *Attorney, Agent, or Firm* — Hartman & Citrin LLC

(57) ABSTRACT

The present disclosure provides various systems and methods for providing enhanced messaging features. An exemplary method for providing a predictive response messaging feature includes receiving a message from a first device (108) at a second device (110) and analyzing the message to determine at least one response option based upon the content of the message. After determining at least one response option, the at least one response option can be presented on a display (202) of the second device (110). A called party can make a selection of one of the at least one response options and the selection can be received on the second device (110). The selection can trigger the creation of a response message based upon the selected response option and the response message can be sent to the first device (108). Other methods and systems are described.

14 Claims, 10 Drawing Sheets

(51) Int. Cl.

| | | |
|---|---|---|
| *H04N 7/173* | (2011.01) | |
| *H04W 4/00* | (2009.01) | |
| *H04M 3/493* | (2006.01) | |
| *H04L 12/18* | (2006.01) | |
| *G06Q 10/10* | (2012.01) | |
| *G06F 17/27* | (2006.01) | |
| *H04L 12/58* | (2006.01) | |
| *G06F 3/0489* | (2013.01) | |
| *G06F 17/30* | (2006.01) | |
| *H04L 29/12* | (2006.01) | |
| *H04M 1/725* | (2006.01) | |
| *H04L 29/08* | (2006.01) | |
| *H04M 3/533* | (2006.01) | |
| *H04W 4/16* | (2009.01) | |
| *H04M 1/2745* | (2006.01) | |
| *H04M 3/42* | (2006.01) | |

(52) U.S. Cl.
CPC ....... *G06F 17/30654* (2013.01); *G06Q 10/107* (2013.01); *H04L 12/1818* (2013.01); *H04L 29/12047* (2013.01); *H04L 29/12122* (2013.01); *H04L 29/12132* (2013.01); *H04L 51/046* (2013.01); *H04L 51/18* (2013.01); *H04L 51/28* (2013.01); *H04L 61/1547* (2013.01); *H04L 61/1552* (2013.01); *H04L 61/1594* (2013.01); *H04L 67/1095* (2013.01); *H04M 1/274516* (2013.01); *H04M 1/72572* (2013.01); *H04M 3/53333* (2013.01); *H04W 4/16* (2013.01); *H04L 29/12169* (2013.01); *H04L 51/14* (2013.01); *H04L 61/1576* (2013.01); *H04M 1/274508* (2013.01); *H04M 3/42382* (2013.01); *H04M 2203/2011* (2013.01); *H04M 2250/10* (2013.01)

(56) References Cited

U.S. PATENT DOCUMENTS

| | | | |
|---|---|---|---|
| 5,371,673 A * | 12/1994 | Fan ................. 704/1 | |
| 5,692,032 A * | 11/1997 | Seppanen et al. ......... 455/466 | |
| 5,715,370 A | 2/1998 | Luther et al. | |
| 5,894,506 A * | 4/1999 | Pinter ................. 379/88.23 | |
| 5,905,959 A | 5/1999 | Foladare et al. | |
| 5,943,399 A * | 8/1999 | Bannister et al. ......... 379/88.17 | |
| 6,044,275 A | 3/2000 | Boltz et al. | |
| 6,085,201 A * | 7/2000 | Tso ................. 715/205 | |
| 6,138,008 A | 10/2000 | Dunn et al. | |
| 6,182,059 B1 * | 1/2001 | Angotti et al. ............. 706/45 | |
| 6,278,968 B1 * | 8/2001 | Franz et al. ................. 704/3 | |
| 6,278,996 B1 * | 8/2001 | Richardson et al. .......... 1/1 | |
| 6,356,633 B1 * | 3/2002 | Armstrong ............. 379/265.11 | |
| 6,393,421 B1 | 5/2002 | Paglin | |
| 6,411,947 B1 * | 6/2002 | Rice et al. ................. 706/47 | |
| 6,418,308 B1 * | 7/2002 | Heinonen et al. ......... 455/414.3 | |
| 6,477,551 B1 * | 11/2002 | Johnson et al. ............. 715/202 | |
| 6,480,484 B2 | 11/2002 | Morton | |
| 6,522,877 B1 * | 2/2003 | Lietsalmi et al. .......... 455/422.1 | |
| 6,622,021 B1 * | 9/2003 | Takala ................. 455/466 | |
| 6,718,367 B1 * | 4/2004 | Ayyadurai ............. 709/206 | |
| 6,718,368 B1 * | 4/2004 | Ayyadurai ............. 709/206 | |
| 6,938,068 B1 * | 8/2005 | Kraft et al. ............. 709/203 | |
| 7,058,652 B2 * | 6/2006 | Czarnecki et al. ............. 1/1 | |
| 7,130,885 B2 * | 10/2006 | Chandra et al. ............. 709/206 | |
| 7,137,070 B2 * | 11/2006 | Brown et al. ............. 715/744 | |
| 7,149,782 B2 | 12/2006 | Sommerer | |
| 7,225,232 B2 * | 5/2007 | Elberse ................. 709/206 | |
| 7,280,818 B2 * | 10/2007 | Clayton ................. 455/407 | |
| 7,363,246 B1 * | 4/2008 | Van Horn et al. ............. 705/80 | |
| 7,383,250 B2 | 6/2008 | Scian et al. | |
| 7,418,496 B2 * | 8/2008 | Macey et al. ............. 709/224 | |
| 7,546,131 B1 * | 6/2009 | Sidi et al. ................. 455/466 | |
| 7,552,178 B2 * | 6/2009 | Chen et al. ............. 709/206 | |
| 7,619,584 B2 * | 11/2009 | Wolf ................. 345/1.2 | |
| 7,650,157 B2 * | 1/2010 | Clayton ................. 455/456.1 | |
| 7,657,250 B2 * | 2/2010 | Clayton ................. 455/407 | |
| 7,657,600 B2 * | 2/2010 | Auhagen ............. 709/206 | |
| 7,756,535 B1 * | 7/2010 | Diao et al. ............. 455/466 | |
| 7,844,666 B2 * | 11/2010 | Horvitz et al. ............. 709/206 | |
| 7,925,620 B1 | 4/2011 | Yoon | |
| 7,996,372 B2 * | 8/2011 | Rubel, Jr. ............. 707/694 | |
| 8,069,143 B2 | 11/2011 | Swanburg et al. | |
| 8,078,978 B2 * | 12/2011 | Perry et al. ............. 715/752 | |
| 8,249,920 B2 * | 8/2012 | Smith ................. 705/14.1 | |
| 8,380,566 B2 * | 2/2013 | Smith ................. 705/14.1 | |
| 8,396,450 B2 * | 3/2013 | Clayton ................. 455/407 | |
| 8,645,468 B2 * | 2/2014 | O'Sullivan et al. ........... 709/205 | |
| 8,849,730 B2 * | 9/2014 | Winn et al. ................. 706/12 | |
| 8,893,023 B2 * | 11/2014 | Perry et al. ............. 715/752 | |
| 8,954,510 B2 * | 2/2015 | Chen et al. ............. 709/206 | |
| 2001/0041566 A1 | 11/2001 | Xanthos et al. | |
| 2002/0007346 A1 | 1/2002 | Qiu et al. | |
| 2002/0035684 A1 | 3/2002 | Vogel et al. | |
| 2002/0138582 A1 * | 9/2002 | Chandra et al. ............. 709/206 | |
| 2002/0169841 A1 * | 11/2002 | Carlson et al. ............. 709/206 | |
| 2002/0178041 A1 * | 11/2002 | Krantz et al. ............. 705/8 | |
| 2003/0154256 A1 * | 8/2003 | Hadano et al. ............. 709/206 | |
| 2003/0188037 A1 * | 10/2003 | Elberse ................. 709/311 | |
| 2003/0193951 A1 | 10/2003 | Fenton et al. | |
| 2004/0001086 A1 * | 1/2004 | Brown et al. ............. 345/744 | |
| 2004/0034561 A1 * | 2/2004 | Smith ................. 705/14 | |
| 2004/0052342 A1 * | 3/2004 | Jugovec et al. ............. 379/88.22 | |
| 2004/0059700 A1 * | 3/2004 | Park et al. ................. 707/1 | |
| 2004/0128151 A1 | 7/2004 | Mock et al. | |
| 2004/0208297 A1 | 10/2004 | Valentine | |
| 2004/0230689 A1 | 11/2004 | Loveland | |
| 2004/0230989 A1 * | 11/2004 | Macey et al. ............. 725/24 | |
| 2005/0021551 A1 | 1/2005 | Silva et al. | |
| 2005/0021636 A1 * | 1/2005 | Kumar ................. 709/206 | |
| 2005/0074169 A1 * | 4/2005 | Filatov et al. ............. 382/229 | |
| 2005/0076110 A1 * | 4/2005 | Mathew et al. ............. 709/223 | |
| 2005/0120084 A1 | 6/2005 | Hu et al. | |
| 2005/0198582 A1 * | 9/2005 | Hennum et al. ............. 715/772 | |
| 2005/0199714 A1 * | 9/2005 | Brandt et al. ............. 235/382.5 | |
| 2005/0209861 A1 | 9/2005 | Hewes et al. | |
| 2006/0030297 A1 | 2/2006 | Coble et al. | |
| 2006/0041626 A1 * | 2/2006 | Chen et al. ............. 709/206 | |
| 2006/0052091 A1 | 3/2006 | Onyon et al. | |
| 2006/0095575 A1 * | 5/2006 | Sureka et al. ............. 709/227 | |
| 2006/0104429 A1 | 5/2006 | Wouterse et al. | |
| 2006/0115062 A1 * | 6/2006 | Gonder et al. ............. 379/142.01 | |
| 2006/0149819 A1 * | 7/2006 | Auhagen ............. 709/206 | |
| 2006/0167834 A1 * | 7/2006 | Rubel ................. 707/1 | |
| 2006/0168065 A1 * | 7/2006 | Martin ................. 709/206 | |
| 2006/0205416 A1 | 9/2006 | Kayzar et al. | |
| 2006/0246881 A1 | 11/2006 | Winkler et al. | |
| 2006/0250987 A1 * | 11/2006 | White et al. ............. 370/260 | |
| 2006/0253537 A1 * | 11/2006 | Thomas ................. 709/206 | |
| 2006/0274721 A1 | 12/2006 | Flanagan | |
| 2006/0277139 A1 * | 12/2006 | Poltorak ................. 705/38 | |
| 2006/0277176 A1 * | 12/2006 | Liao ................. 707/5 | |
| 2007/0022099 A1 * | 1/2007 | Yoshimura et al. ............. 707/3 | |
| 2007/0026852 A1 | 2/2007 | Logan et al. | |
| 2007/0027954 A1 * | 2/2007 | Chen et al. ............. 709/206 | |
| 2007/0038942 A1 * | 2/2007 | Chen et al. ............. 715/752 | |
| 2007/0064920 A1 | 3/2007 | Ruckart | |
| 2007/0073810 A1 * | 3/2007 | Adams et al. ............. 709/205 | |
| 2007/0088798 A1 * | 4/2007 | Merrill et al. ............. 709/217 | |
| 2007/0100631 A1 | 5/2007 | Bodin et al. | |
| 2007/0136431 A1 | 6/2007 | Sun | |
| 2007/0155411 A1 * | 7/2007 | Morrison ................. 455/466 | |
| 2007/0233736 A1 * | 10/2007 | Xiong et al. ............. 707/104.1 | |
| 2007/0249379 A1 | 10/2007 | Bantukul | |
| 2007/0266118 A1 | 11/2007 | Wilkins | |
| 2007/0266156 A1 | 11/2007 | Wilkins | |
| 2007/0288576 A1 * | 12/2007 | Illg ................. 709/206 | |
| 2008/0004005 A1 | 1/2008 | Jensen | |
| 2008/0046807 A1 * | 2/2008 | Margitich et al. ............. 715/222 | |
| 2008/0062133 A1 * | 3/2008 | Wolf ................. 345/168 | |
| 2008/0077468 A1 * | 3/2008 | Raskin ................. 705/10 | |
| 2008/0109735 A1 * | 5/2008 | Vuong ................. 715/752 | |
| 2008/0126488 A1 * | 5/2008 | O'Sullivan et al. ............. 709/206 | |

(56) References Cited

U.S. PATENT DOCUMENTS

| | | | |
|---|---|---|---|
| 2008/0133677 A1 | 6/2008 | Pattabhiraman et al. | |
| 2008/0189293 A1 | 8/2008 | Strandel et al. | |
| 2008/0235242 A1 | 9/2008 | Swanburg et al. | |
| 2008/0250332 A1 | 10/2008 | Farrell et al. | |
| 2008/0300982 A1* | 12/2008 | Larson et al. | 705/14 |
| 2009/0022285 A1* | 1/2009 | Swanburg et al. | 379/88.11 |
| 2009/0106695 A1* | 4/2009 | Perry et al. | 715/816 |
| 2009/0282114 A1* | 11/2009 | Feng et al. | 709/206 |
| 2009/0285129 A1 | 11/2009 | Swanburg et al. | |
| 2010/0179991 A1* | 7/2010 | Lorch et al. | 709/206 |
| 2010/0287241 A1* | 11/2010 | Swanburg et al. | 709/206 |
| 2012/0066177 A1 | 3/2012 | Swanburg et al. | |
| 2012/0089925 A1* | 4/2012 | Perry et al. | 715/752 |
| 2012/0166561 A1* | 6/2012 | Kelly | 709/206 |
| 2012/0245925 A1* | 9/2012 | Guha et al. | 704/9 |
| 2012/0303460 A1* | 11/2012 | Smth | 705/14.64 |
| 2013/0117691 A1* | 5/2013 | Chang et al. | 715/752 |
| 2013/0159220 A1* | 6/2013 | Winn et al. | 706/12 |
| 2014/0164947 A1* | 6/2014 | O'Sullivan et al. | 715/752 |
| 2014/0351189 A1* | 11/2014 | Winn et al. | 706/21 |

FOREIGN PATENT DOCUMENTS

| | | | |
|---|---|---|---|
| EP | 1755294 | 2/2007 | |
| EP | 1918825 A1 * | 5/2008 | G06F 17/27 |
| WO | 9949679 | 9/1999 | |
| WO | 02087197 | 10/2002 | |
| WO | 2005015927 | 2/2005 | |
| WO | 2008118878 | 10/2008 | |

OTHER PUBLICATIONS

U.S. Office Action dated Dec. 27, 2010 in U.S. Appl. No. 12/051,336.
U.S. Notice of Allowance dated Jul. 15, 2011 in U.S. Appl. No. 12/051,336.
U.S. Office Action dated Dec. 7, 2009 in U.S. Appl. No. 11/873,031.
U.S. Office Action dated May 26, 2010 in U.S. Appl. No. 11/873,031.
U.S. Office Action dated Feb. 16, 2012 in U.S. Appl. No. 11/873,031.
U.S. Office Action dated Jul. 25, 2012 in U.S. Appl. No. 11/873,031.
U.S. Office Action dated Sep. 21, 2011 in U.S. Appl. No. 12/053,525.
U.S. Office Action dated Aug. 6, 2012 in U.S. Appl. No. 12/053,525.
U.S. Office Action dated Sep. 15, 2010 in U.S. Appl. No. 12/053,512.
U.S. Office Action dated Mar. 1, 2011 in U.S. Appl. No. 12/053,512.
U.S. Office Action dated Jul. 6, 2011 in U.S. Appl. No. 12/053,512.
U.S. Office Action dated Feb. 9, 2012 in U.S. Appl. No. 12/053,512.
U.S. Office Action dated Oct. 12, 2012 in U.S. Appl. No. 12/053,512.
Pearlman, L., "A Community Authorization Service for Group Collaboration," Jun. 2002, IEEE 3rd International Workshop, pp. 50-59.
Notice of Allowance mailed on Mar. 6, 2014 in U.S. Appl. No. 12/053,525.
Office Action mailed on Nov. 25, 2013 in U.S. Appl. No. 13/296,374.
International Application No. PCT/US2008/058052 Written Opinion dated Sep. 29, 2009.
International Application No. PCT/US2008/058052 International Search Report dated Oct. 7, 2008.
International Application No. PCT/US2008/058055 Written Opinion dated Sep. 29, 2009.
International Application No. PCT/US2008/058055 International Search Report dated Jul. 3, 2009.
International Application No. PCT/US2008/058057 Written Opinion dated Sep. 29, 2009.
International Application No. PCT/US2008/058057 International Search Report dated Jul. 7, 2008.
International Application No. PCT/US2008/058064 Written Opinion dated Sep. 29, 2009.
International Application No. PCT/US2008/058064 International Search Report dated Aug. 21, 2008.
International Application No. PCT/US2008/058067 Written Opinion dated Sep. 29, 2009.
International Application No. PCT/US2008/058067 International Search Report dated Oct. 27, 2008.
U.S. Office Action mailed on Jan. 27, 2015 in U.S. Appl. No. 13/296,374.
U.S. Office Action mailed on May 11, 2015 in U.S. Appl. No. 14/669,372.
"3rd Generation Partnership Project; Technical Specification Group Services and System Aspects; Support of SMS and MMS Over Generic 3GPP IP Access," 3GPP TR 23.804 v7.1.0 (Sep. 2005).
U.S. Office Action dated Sep. 9, 2015 in U.S. Appl. No. 12/053,525.
U.S. Office Action dated Sep. 15, 2015 in U.S. Appl. No. 14/669,372.

* cited by examiner

PROVIDING A PREDICTIVE RESPONSE FEATURE FOR MESSAGING APPLICATIONS BY ANALYZING THE TEXT OF A MESSAGE USING TEXT RECOGNITION LOGIC

RELATED APPLICATION

This application is a National Stage Entry of International Application No. PCT/US2008/058067, filed on Mar. 24, 2008. This application claims priority to U.S. Provisional Patent Application No. 60/896,728, filed Mar. 23, 2007, the entirety of which is hereby incorporated by reference.

TECHNICAL FIELD

The present disclosure relates generally to messaging and, more particularly, to enhanced messaging features.

BACKGROUND

Wireless messaging services, such as text messaging, allow users to generate and send messages to other users within a wireless communications network. Typically, a text message is sent to a Short Message Service Center (SMSC) that stores the text message and attempts to send the message to the recipient. If the recipient is not available, the SMSC queues the message for a later retry attempt. This type of delivery system is commonly referred to as a store-and-forward delivery system.

SMS delivery is also characterized as a best effort delivery system. As such, there is no guarantee that a message will be delivered to the intended recipient or that the message will be delivered at a certain time. In some instances the message is lost and never sent to the recipient.

Multimedia Messaging Service (MMS) allows users to exchange multimedia communications between capable mobile phones and other devices. MMS is an extension of the SMS protocol that defines a way to send and receive messages that include images, audio, and video in addition to text.

SUMMARY

The present disclosure provides various systems and methods for providing enhanced messaging features. In a first method of the present disclosure, a method for providing a predictive response messaging feature includes receiving a message from a first device at a second device and analyzing the message to determine at least one response option based upon the content of the message. After determining at least one response option, the at least one response option can be presented on a display of the second device. A called party can make a selection of at least one of the at least one response options and the selection can be received on the second device. The selection can trigger the creation of a response message based upon the selected response option and the response message can be sent to the first device.

In another method of the present disclosure, a method for providing a messaging feature with user-defined response options includes receiving an input on a first device. The input can include an identification of at least one recipient, a message body, and special characters defining at least one response option in the message body. The method can further include creating a message based upon the input and sending the message from the first device to a second device, where the second device receives the message and analyzes the message body to parse out the at least one response option defined by the special character and the text of the message body. After determining at least one response option, the at least one response option can be presented on a display of the second device. A called party can make a selection of one of the at least one response options and the selection can be received on the second device. The selection can trigger the creation of a response message based upon the selected response option and the response message can be sent to the first device.

In yet another method of the present disclosure, a method for providing a web-based response messaging feature includes receiving an input on a first device. The input can include an identification of at least one recipient, a message body, and special characters defining at least one response option in the message body. The method can further include creating a first message based upon the input and sending the first message from the first device to an application server, where the application server receives the message and analyzes the message body to parse out the at least one response option defined by the special character and the text of the message body. The application server can generate a web page that includes the text of the message body and the at least one response option determined in the analyzing step and create a second message that includes a link to the web page. The application server can send the second message to a second device and present the web page on a display of the second device in response to the second device accessing the link. A called party can make a selection of one of the at least one response options and the selection can be received at the application server. The selection can trigger the creation, at the application server, of a response message based upon the selected response option and the response message can be sent to the first device.

The methods described above can further include receiving the response message at the first device, creating a response message list comprising the response message, and displaying the response message list in at least one view. The view can be a list view, a poll view, or a task list view, for example.

The input described above can be received from manual entry on the first device or can be received in at least one pre-defined entry field.

In a system of the present disclosure, a first device can be configured to create a first message based upon input. The input can include an identification of at least one recipient, a message body, and special characters defining at least one response option in the message body. The system can further include an application server configured to receive the first message and analyze the first message to parse out the at least one response option and generate a web page based upon the message body and the at least one response option. The application server can be further configured to create a second message that includes a link to the web page and send the second message to a second device. The second device can access the web page and view the first message and any available response options.

DETAILED DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
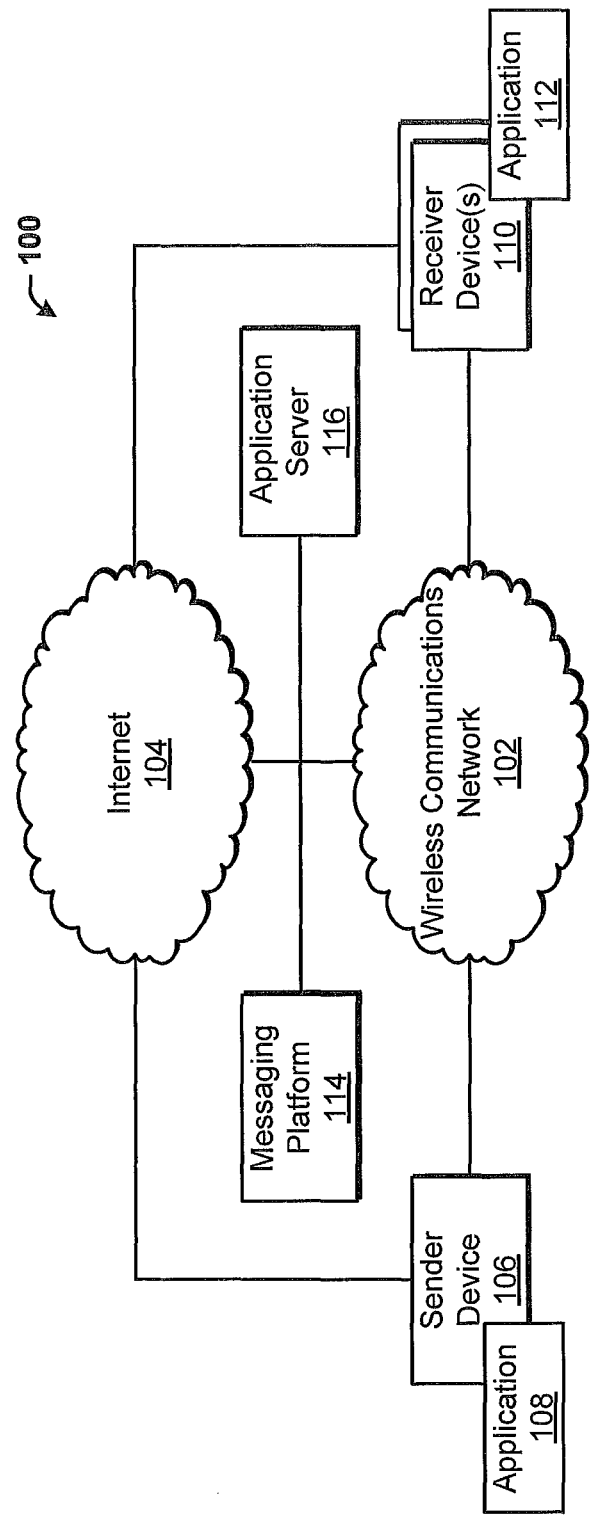
FIG. 1 schematically illustrates an exemplary network system with which the present disclosure can be implemented.

Referring to the drawings wherein like numerals represent like elements throughout the several views, FIG. 1 illustrates an exemplary network system 100 for implementing various aspects of the present disclosure. The illustrated network system 100 includes a wireless communications network 102 that is in communication with the Internet 104.

By way of example, the wireless communications network 102 can be configured as a 2G GSM (Global System for Mobile communications) network and provide data communications via GPRS (General Packet Radio Service), and EDGE (Enhanced Data rates for GSM Evolution). By way of further example, the wireless communications network 102 can be configured as a 3G UMTS (Universal Mobile Telecommunications System) network and provide data communications via the HSPA (High-Speed Packet Access) protocol family, such as, HSDPA (High-Speed Downlink Packet Access), EUL (Enhanced Uplink) or otherwise termed HSUPA (High-Speed Uplink Packet Access), and HSPA+ (Evolved HSPA). The wireless communications network 102 is also compatible with future mobile communications standards including, but not limited to, pre-4G and 4G, for example. Moreover, the wireless communications network 102 can be configured to provide messaging services via Short Message Service (SMS), Multimedia Message Service (MMS), and instant messaging, extensions thereof, evolutions thereof, and like current and future messaging technologies, for example. As such, embodiments are described herein in context of one or more of these messaging technologies.

The wireless communications network 102 can include radio access network (RAN) components and core network components for circuit-switched and packet-switched communications. Advanced architectures, such as Internet Protocol Multimedia Subsystem (IMS) are also contemplated. SMS over IP and MMS over IP are also contemplated The wireless communications network 102 is illustrated as being in communication with a sender device 106. The sender device 106 can be any device capable of communication with one or both of the wireless communications network 102 and the Internet 104. For example, the sender device 106 can be a cellular telephone, a Wi-Fi telephone, a VoIP telephone with messaging capabilities, a dual or multi-mode telephone, a computer, a personal digital assistant, a handheld computer, a gaming system, and the like. The sender device 106 can be operated by a calling party, that is, the user of the sender device 106 who creates a message on the sender device 106 and selects one or more recipients to which to send the message.

The sender device 106 is illustrated as including an application 108 for use in implementing various embodiments of the present disclosure. In one embodiment, the application 108 can include a messaging application configured in accordance with one or more messaging protocols, such as SMS or MMS. In another embodiment, the application 108 can include a messaging application configured to generate one or more response options based upon an input by the calling party. In yet another embodiment, the application 108 receives an input from the calling party of a message body and special characters used to define one or more response options. In still another embodiment, the application 108 can be configured as an instant messaging application that can allow a user to define one or more responses or select one or more response options to send via an instant messaging connection. Various methods employing the different embodiments of the application 108 are described in detail with reference to FIGS. 3-5.

The sender device 106 can communicate with one or more receiver devices 110 via at least one of the wireless communications network 102 and the Internet 104. The receiver device 110 can be any device capable of communication with one or both of the wireless communications network 102 and the Internet 104. For example, the receiver device 110 can be a cellular telephone, a Wi-Fi telephone, a VoIP telephone with messaging capabilities, a dual or multi-mode telephone, a computer, a personal digital assistant, a handheld computer, a gaming system, and the like. The receiver device 110 can be operated by a called party, that is, the user of the receiver device 110. The receiver device 110 receives a message from the sender device 106 and the called party can select a response option from which a response message is created and sent to the sender device 106.

The receiver device(s) 110 are also illustrated as including an application 112 for use in implementing various embodiments of the present disclosure. In one embodiment, the application 112 can include text recognition logic to recognize words, typical word usage, and sentence structure to determine one or more responses. In another embodiment, the application 112 can be configured to analyze a message containing special characters to determine one or more responses. In yet another embodiment, the application 112 can be configured to access a web page to retrieve a message. In still another embodiment, the application 112 can be configured as an instant messaging application that can receive one or more pre-defined responses from the application 108 on the sender device 106 via an instant messaging connection. The application 112 can be configured to create and send a response message automatically upon a selection by the called party of one of the one or more available response options. Various methods employing the different embodiments of the application 112 are described in detail with reference to FIGS. 3-5. It will be appreciated that the functions of the application 108 and the application 112 can be performed by the same hardware, software, or a combination thereof.

The network system 100 is illustrated as further including a messaging platform 114 that can offer SMS, MMS, instant messaging, and like messaging features in accordance with the various embodiments described herein. The messaging platform 114 can include a Short Message Service Center (SMSC), a Multimedia Message Service Center (MMSC), and instant messaging servers, for example. The messaging platform 114 can operate using messaging protocols including, but not limited to, Short Message Peer-to-Peer (SMPP), OSCAR protocol, Session Initiation Protocol (SIP), SIMPLE, and like protocols.

The network system 100 is illustrated as further including an application server 116. The application server 116 is configured in accordance with one embodiment of the present invention that is described in detail with particular reference to FIG. 5.

Figure 2:
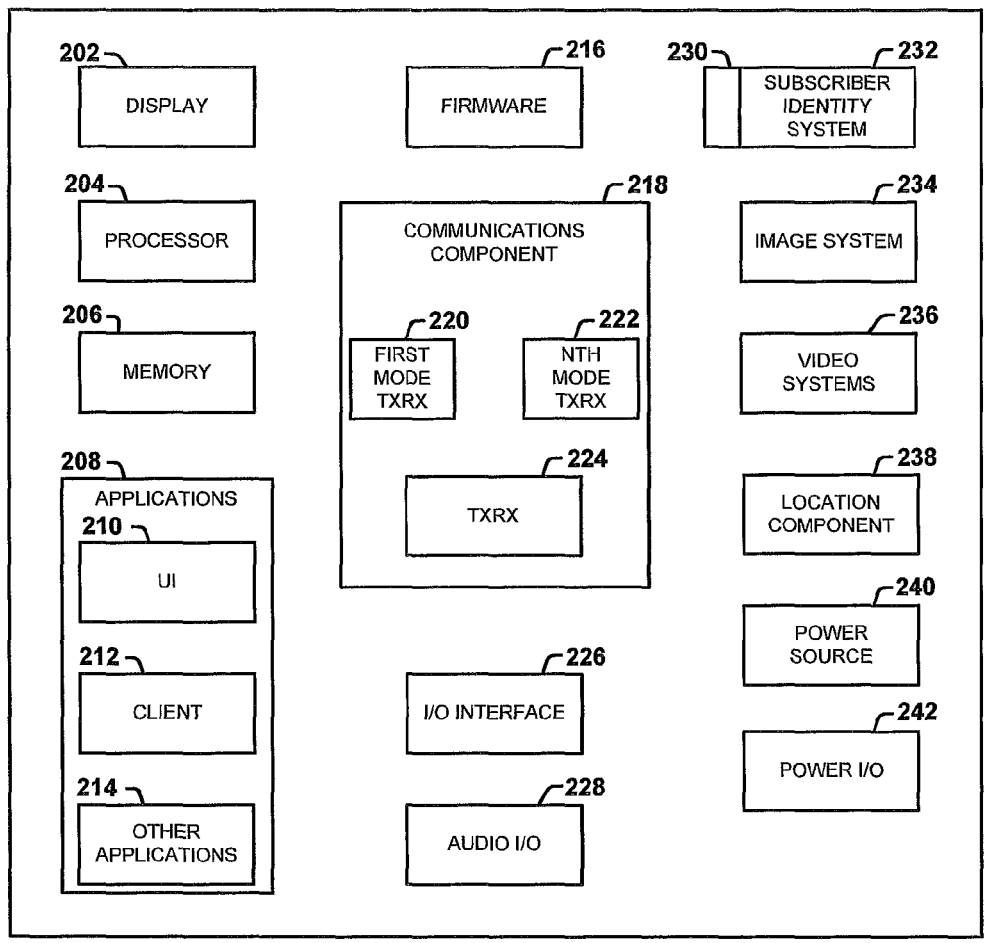
FIG. 2 schematically illustrates a block diagram of an exemplary mobile device suitable for implementing an embodiment of the present disclosure.

Referring now to FIG. 2, a block diagram illustrating various components of an exemplary device 200 is shown, according to the present application. The exemplary device 200 is provided as an exemplary example of the sender device 106 and the receiver device 110. Although no connections are shown between the components illustrated and described in FIG. 2, the components can interact with each other to carry out device functions.

As illustrated, the device 200 can be a single-mode or multi-mode mobile communications device. FIG. 2 and the following discussion are intended to provide a brief, general description of a suitable environment in which the various aspects of an embodiment of the present application can be implemented. While the description includes a general context of computer-executable instructions, the present application can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 200 includes a display 202 for displaying multimedia such as, for example, text, images, video, telephony functions, caller line ID data, setup functions, menus, messages, wallpaper, graphics, and the like. The device 200 also includes a processor 204 for controlling and/or processing data. A memory 206 can interface with the processor 204 for the storage of data and/or applications 208. The memory 206 can include a variety of computer readable media including, but not limited to, volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD-ROM, DVD, or other optical disk storage, magnetic tape, magnetic disk storage, other magnetic storage devices, or any other medium that can be used to store the desired information and that can be accessed by the device 200.

The memory 206 can be configured to store one or more applications 208, such as, for example, the application 108 stored in a memory of the sender device 106 and the application 112 stored in a memory of the receiver device 110. The applications 208 can also include a user interface (UI) application 210. The UI application 210 can interface with a client 212 (e.g., an operating system) to facilitate user interaction with device functionality and data, for example, answering/initiating calls, entering/deleting data, configuring settings, address book manipulation, multi-mode interaction, and the like. The applications 208 can include other applications 214, such as, for example, a delayed messaging application. The applications 208 can be stored in the memory 206 and/or in a firmware 216, and can be executed by the processor 204. The firmware 216 can also store code for execution during initialization of the device 200.

A communications component 218 can interface with the processor 204 to facilitate wired/wireless communications with external systems including, for example, cellular networks, VoIP networks, LAN, WAN, MAN, PAN, that can be implemented using WiFi, WiMax, combinations and/or improvements thereof, and the like. The communications component 218 can also include a multi-mode communications subsystem for providing cellular communications via different cellular technologies. For example, a first cellular transceiver 220 can operate in one mode, for example, GSM, and an Nth transceiver 222 can operate in a different mode, for example WiFi. While only two transceivers 220, 222 are illustrated, it should be appreciated that a plurality of transceivers can be included. The communications component 218 can also include a transceiver 224 for unlicensed RF communications using technology such as, for example, WiFi, WiMAX, near-field communications, other RF and the like. The transceiver 224 can also be configured for line-of-sight technologies, such as, infrared and IRDA, for example. Although a single transceiver 224 is illustrated, multiple transceivers for unlicensed RF and line-of-sight technologies are contemplated.

The communications component 218 can also facilitate communications reception from terrestrial radio networks, digital satellite radio networks, Internet-based radio services networks, combinations thereof, and the like. The communications component 218 can process data from a network, such as, for example, the Internet, a corporate WAN, an intranet, a home broadband network, and the like, via an ISP, DSL provider, or other broadband service provider.

An input/output (I/O) interface 226 can be provided for input/output of data and/or signals. The I/O interface 226 can be a hardwire connection, such as, for example, a USB, PS2, IEEE 1394, serial, parallel, IEEE 802.3 (e.g., Ethernet—RJ45, RJ48), traditional telephone jack (e.g., RJ11, RJ14, RJ25) and the like, and can accept other I/O devices, such as, for example, a keyboard, keypad, mouse, interface tether, stylus pen, printer, plotter, jump/thumb drive, touch screen, multi-touch screen, touch pad, trackball, joy stick, controller, monitor, display, LCD, plasma, OLED, combinations thereof, and the like.

Audio capabilities can be provided by an audio I/O component 228 that can include a speaker (not shown) for the output of audio signals and a microphone (not shown) to collect audio signals.

The device 200 can include a slot interface 230 for accommodating a subscriber identity system 232, such as, for example, a SIM or universal SIM (USIM). The subscriber identity system 232 instead can be manufactured into the device 200, thereby obviating the need for a slot interface 230.

The device 200 can include an image capture and processing system 234. Photos and/or videos can be obtained via an associated image capture subsystem of the image system 234, for example, a camera. The device 200 can also include a video systems component 236 for processing, recording, and/or transmitting video content.

A location component 238 can be included to send and/or receive signals, such as, for example, GPS data, assisted GPS data, triangulation data, combinations thereof, and the like. The device 200 can use the received data to identify its location or can transmit data used by other devices to determine the device 200 location.

The device 200 can include a power source 240 such as batteries and/or other power subsystem (AC or DC). The power source 240 can be single-use, continuous, or rechargeable. In the case of the latter, the power source 240 can interface with an external power system or charging equipment via a power I/O component 242.

Figure 3:
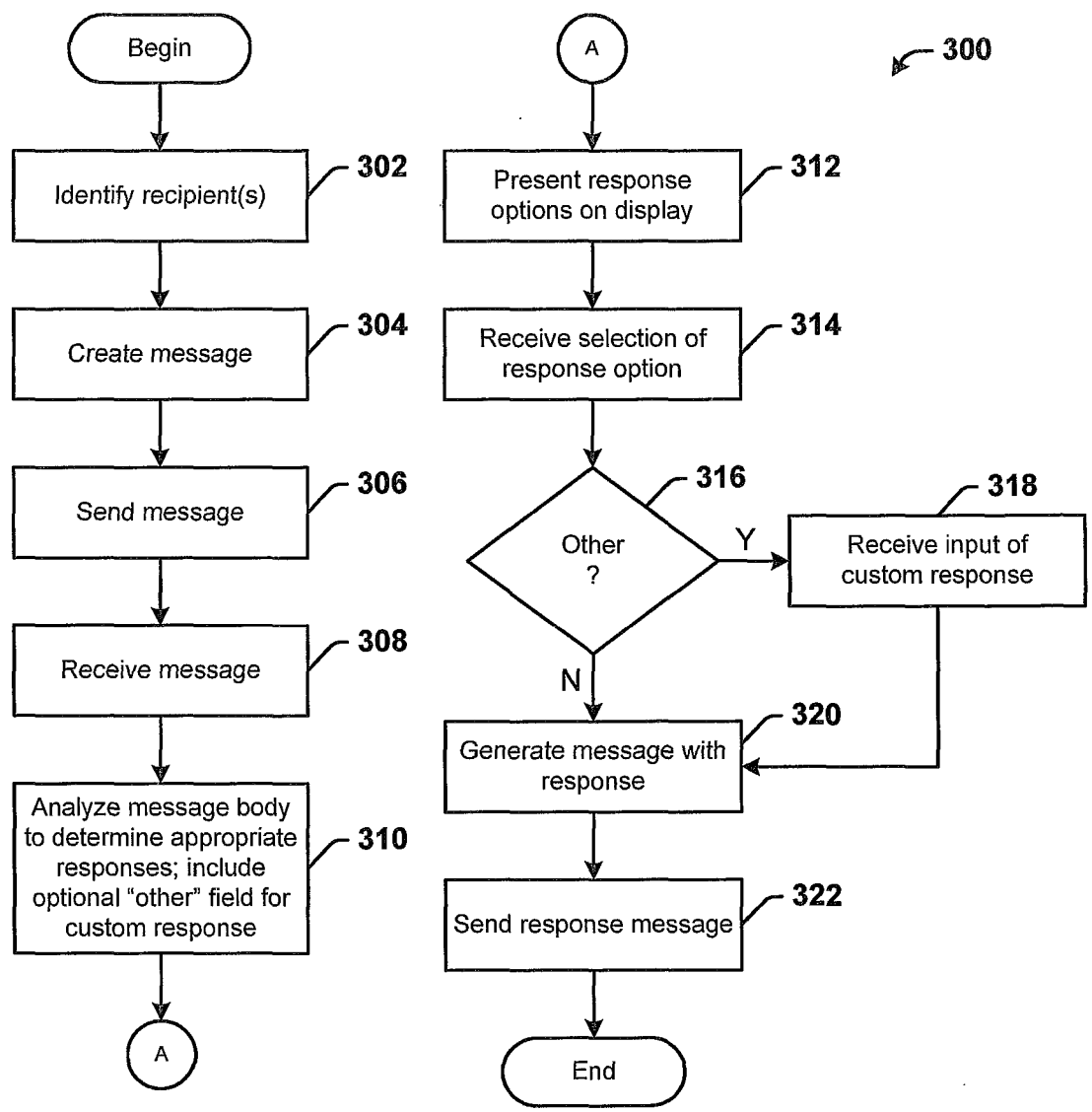
FIG. 3 schematically illustrates a method for providing a predictive response feature for a messaging application, according to an exemplary embodiment of the present disclosure.

Referring now to FIG. 3, an exemplary method 300 for providing a predictive response feature for a messaging application is illustrated, according to an exemplary embodiment of the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. There is no requirement that the method 300 be performed in its entirety. Some or all steps of this process, and/or substantially equivalent steps, can be performed by execution of computer-readable instructions included on a computer readable medium, such as the memory 206.

The predictive response feature can enable a sender device 106 to send a legacy SMS message to one or more receiver devices 110. As such the application 108 in this embodiment can include a legacy SMS application configured to create an SMS message from a message body and a telephone number. The application 112 on the receiver device(s) 110 can be configured to analyze the text of the message body using text recognition logic to recognize words, typical word usage, and sentence structure to determine one or more responses. For example, a question that, as determined by the application 112, can appropriately be responded to with a "yes" or "no" response can prompt the application 112 to generate a "yes" response option and a "no" response option. The method 300 is now described.

The method 300 begins and flow proceeds to block 302 wherein a user can identify one or more recipients to whom the calling party would like to send a message. One or more recipients can be selected from a contact list or entered manually on the sender device 106 via a telephone number, for example. The calling party can enter text for a message body and the message is created at block 304. At block 306, the message is sent to the recipient(s) identified in block 302.

At block 308, the message is received. At block 310, the message body is analyzed by the application 112 using recognition logic to determine one or more appropriate responses. A custom field can be provided as an optional response option wherein a user can enter any custom response. At block 312, the response options are presented to the called party on a display 202 of the receiver device 110.

At block 314, a response option is selected. It is determined, at block 316, if the selected response option is a custom response option. If the selected response option is a custom response option, the method 300 flows to block 318 and the called party is prompted to enter a custom response and the custom response is received. A response message can then be generated based upon the custom response entered by the user, at block 320. If, however, the selected response option is not a custom response option, flow proceeds directly to block 320 and a response message is generated that includes the selected response option determined by the application 112. In either case, the response message is sent to the sender device 106, at block 322 and the method 300 ends.

Figure 4:
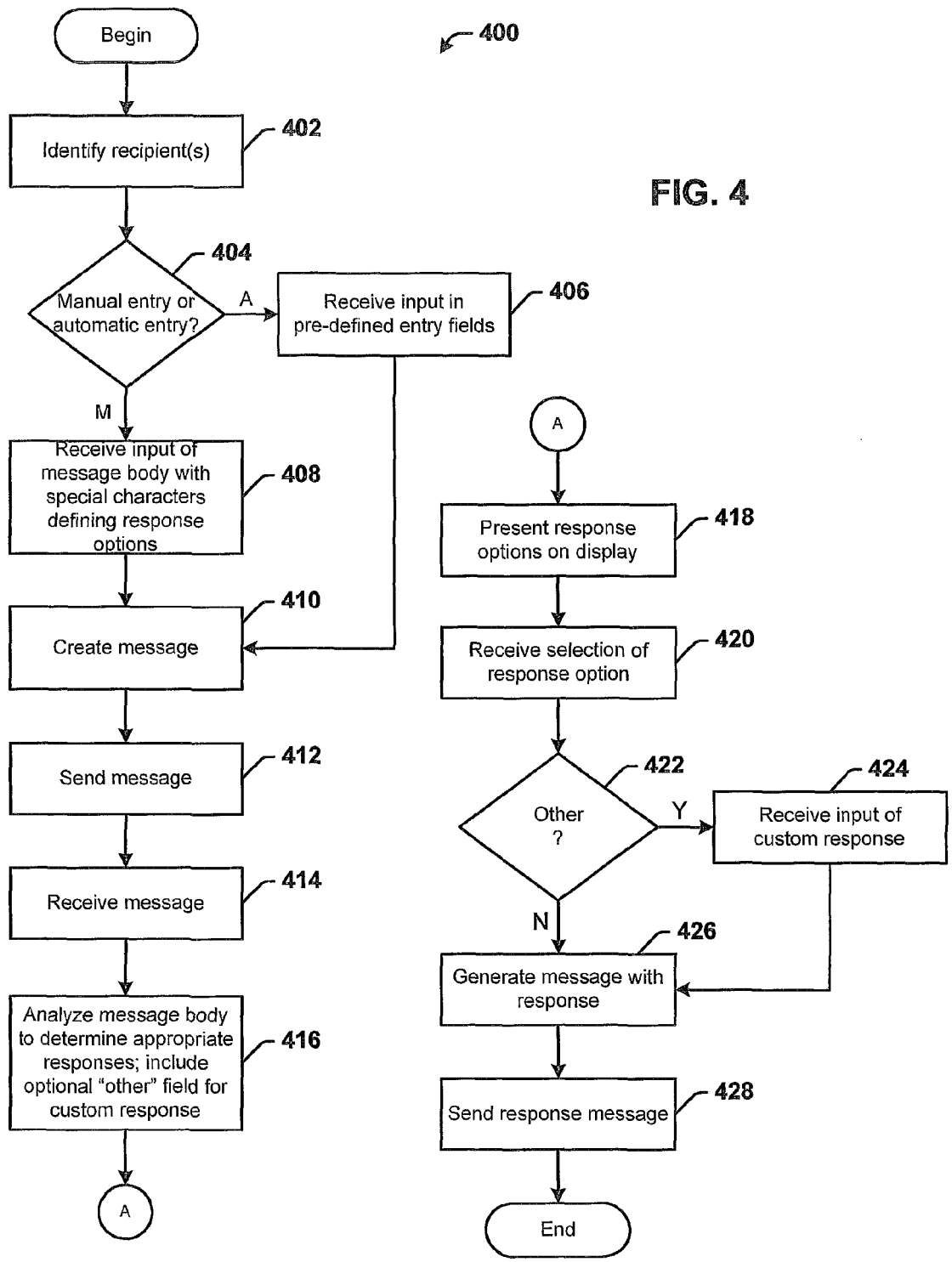
FIG. 4 schematically illustrates a method for providing a response feature with user-defined response options for a messaging application, according to an exemplary embodiment of the present disclosure.

Referring now to FIG. 4, a method 400 for providing a response feature with user-defined response options for a messaging application is illustrated, according to an exemplary embodiment of the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. There is no requirement that the method 400 be performed in its entirety. Some or all steps of this process, and/or substantially equivalent steps, can be performed by execution of computer-readable instructions included on a computer readable medium, such as the memory 206.

Response options can be defined by a calling party in the message body of an SMS text message. Special characters can be used to separate the message body text from one or more response options defined by a user. Special characters can include any characters or combinations thereof that can be recognized by the application 112. The application 112 can be configured so as to recognize the significance of a special character or character combination and parse the message body text and one or more response options received in a message body of a text message. An exemplary text message can include, for example, *first_responsesecond_responsemessage_body*. Instead of requiring a calling party to manually enter each portion of the message, a user interface can prompt a calling party to enter the message body and one or more response options in dedicated entry fields that can be used to generate a message in a format that can be used by the application 112 to determine the one or more response options. This automatic entry feature can mitigate potential user error and provide a more user-friendly experience. Accordingly, in this embodiment, the application 108 can be configured so as to allow for automatic entry. The method 400 is now described.

The method 400 begins and flow proceeds to block 402 wherein a user can identify one or more recipients to whom the calling party would like to send a message. One or more recipients can be selected from a contact list or entered manually on the sender device 106 via a telephone number, for example.

At block 404, the calling party can be provided with an option to choose manual entry or automatic entry of the message body and one or more response options. In another embodiment, the calling party is only offered an automatic entry interface. In yet another embodiment, the calling party is only offered a manual entry interface.

If the application 108 is configured for automatic entry and automatic entry is selected or used by default, the calling party can be prompted to enter the message body and one or more response options in dedicated entry fields, at block 406. If the application 108 is configured only for manual entry or manual is selected or used by default, the calling party can be prompted to enter a message with special characters to define one or more response and the message body text, at block 408.

The message is created at block 410 and sent to the recipient(s) identified in block 402, at block 412. At block 414, the message is received and the message body is analyzed by the application 112 to parse out the user-defined response(s), at block 416. A custom field can be provided as an optional response option wherein a called party can enter any custom response. At block 418, the response options are presented on a display 202 of the receiver device 110.

At block 420, a response option is selected. It is determined, at block 422, if the selected response option is a custom response option. If the selected response option is a custom response option, the method 400 flows to block 424 and the called party is prompted to enter a custom response and the custom response is received. A response message can then be generated based upon the custom response entered by the called party, at block 426. If, however, the selected response option is not a custom response option, flow proceeds directly to block 426 and a response message is generated including the selected response option determined by the application 112. In either case, the response message is sent to the sender device 106, at block 428.

Figure 5:
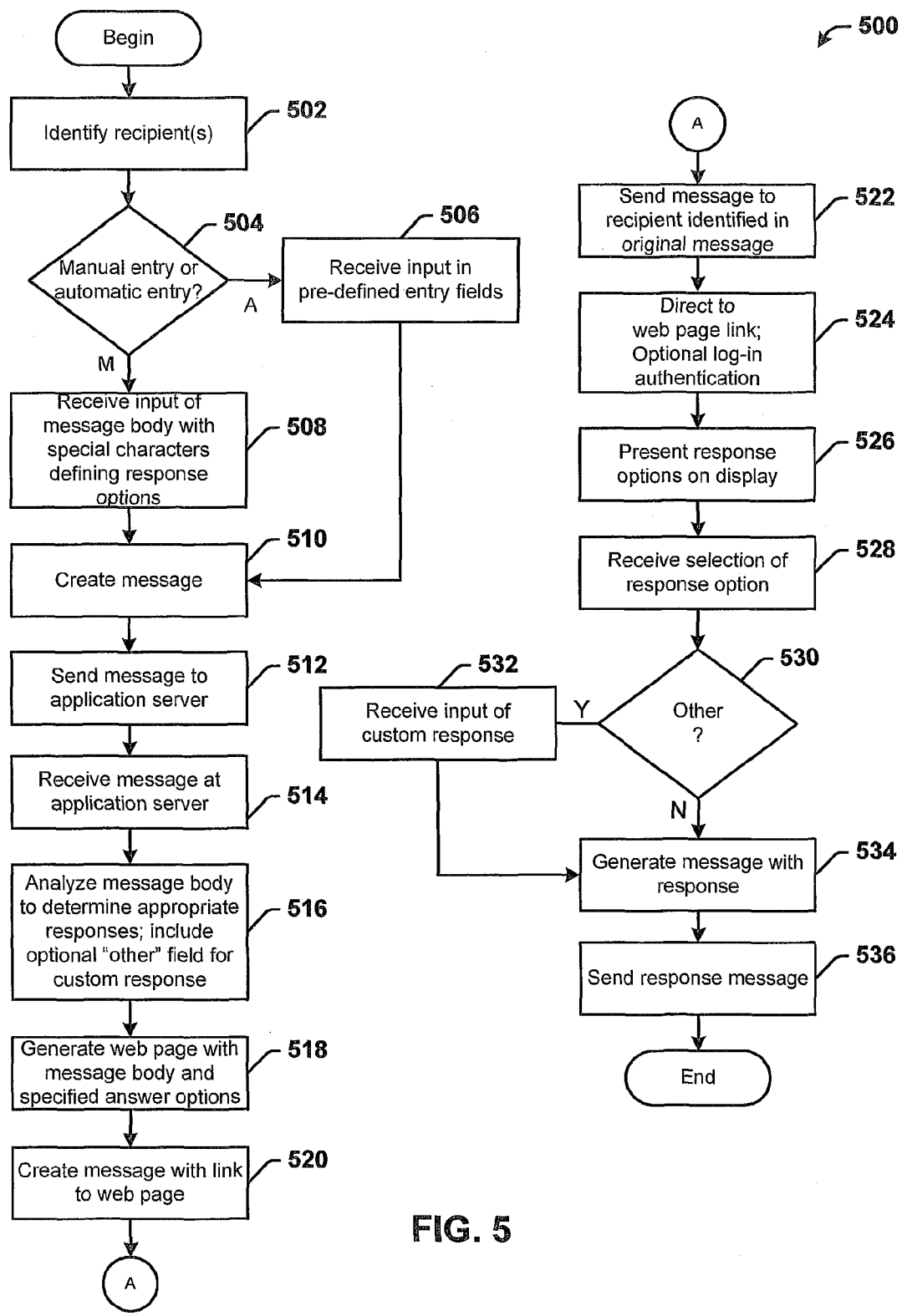
FIG. 5 schematically illustrates a method for providing a web-based response feature for a messaging application, according to an exemplary embodiment of the present disclosure.

Turning now to FIG. 5, a method 500 for providing a web-based response feature for a messaging application is illustrated, according to an exemplary embodiment of the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. There is no requirement that the method 500 be performed in its entirety. Some or all steps of this process, and/or substantially equivalent steps, can be performed by execution of computer-readable instructions included on a computer readable medium, such as the memory 206.

In one implementation, a web-based response feature can be used if the application 112 is not configured to recognize text messages with special characters, such as provided in the preceding method 400. The sender device application 108 can be configured as described above with reference to FIG. 4 and the receiver device application 112 can be configured to access a web page via a link received in a message from the application server 116. The method 500 is now described.

The method 500 begins and flow proceeds to block 502 wherein a calling party can identify one or more recipients to whom the calling party would like to send a message. One or more recipients can be selected from a contact list or entered manually on the sender device 106 via a telephone number, for example.

At block 504, the calling party can be provided with an option to choose manual entry or automatic entry of the message body and one or more response options. In another embodiment, the calling party is only offered an automatic entry interface. In yet another embodiment, the calling party is only offered a manual entry interface.

If the application 108 is configured for automatic entry and automatic entry is selected or used by default, the calling party can be prompted to enter the message body and one or more response options in dedicated entry fields, at block 506.

If the application 108 is configured only for manual entry or manual entry is selected or used by default, the calling party can be prompted to enter a message with special characters to define one or more response and the message body text, at block 508.

The message is created at block 510 and sent to the application server 116, at block 512. The application server 116 receives the message, at block 514. The message body is analyzed by the application server 116 to parse out the user-defined response(s), at block 516. A custom field can be provided as an optional response option wherein a called party can enter any custom response. At block 518, the application server 116 generates a web page with the message body and response options defined in the original message. At block 520, the application server 116 creates a new message with a link to the web page. The application server 116 sends the new message to the receiver device(s) 110 associated with the recipient(s) identified in block 502, at block 522. At block 524, the called party can be automatically directed to the web page link or can be required to select the web page link. A user name and password can be used to authenticate the called party. The user name and password can be established at an earlier time via a registration process or a called party that does not have a user name and password can be required to create one prior to being granted access to the web page. Alternatively, the called party can be authenticated based upon a dedicated IP address, the International Mobile Equipment Identity (IMEI) of the receiver device 110, a Mobile Subscriber Identification Number (MSISDN), and the like.

At block 526, the response options are presented on a display 202 of the receiver device 110. At block 528, a response option is selected. It is determined, at block 530, if the selected response option is a custom response option. If the selected response option is a custom response option, the method 500 flows to block 532 and the called party is prompted to enter a custom response and the custom response is received. A response message can then be generated based upon the custom response entered by the user, at block 534. If the selected response option is not a custom response option, flow proceeds directly to block 534 and a response message is generated including the selected response option determined by the application 112. In either case, the response message is sent to the sender device 106, at block 536 and the method 500 ends.

Figure 6:
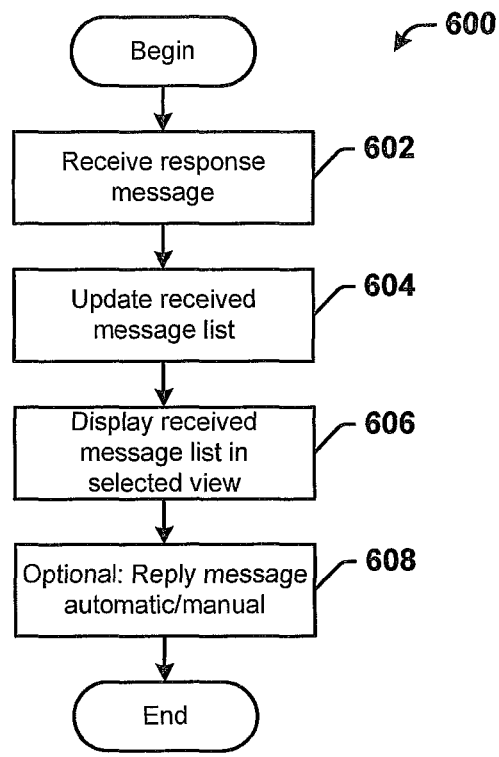
FIG. 6 schematically illustrates a method for handling a response message, according to an exemplary embodiment of the present disclosure.

Referring now to FIG. 6, a method 600 for handling a response message is illustrated, according to an exemplary embodiment of the present disclosure. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. There is no requirement that the method 600 be performed in its entirety. Some or all steps of this process, and/or substantially equivalent steps, can be performed by execution of computer-readable instructions included on a computer readable medium, such as the memory 206.

The method 600 begins and flow proceeds to block 602 wherein the response message, generated by any of the methods 300, 400, 500 described above, is received at the sender device 106. At block 604, a message list of all received response messages is updated to receive the recently received message. At block 606, the message list is displayed in at least one of plurality of selectable views. GUI images of various exemplary response message views are provided in FIGS.

8-10. At block 608, a reply message can be created automatically by the application 108 or manually by the calling party. For example, upon receipt or at a time after the receipt of a response message, the application 108 can create and send a reply message. The calling party can be provided with the option to enter a custom reply message or select a pre-defined message when creating the original message or at any time thereafter.

Figure 7:
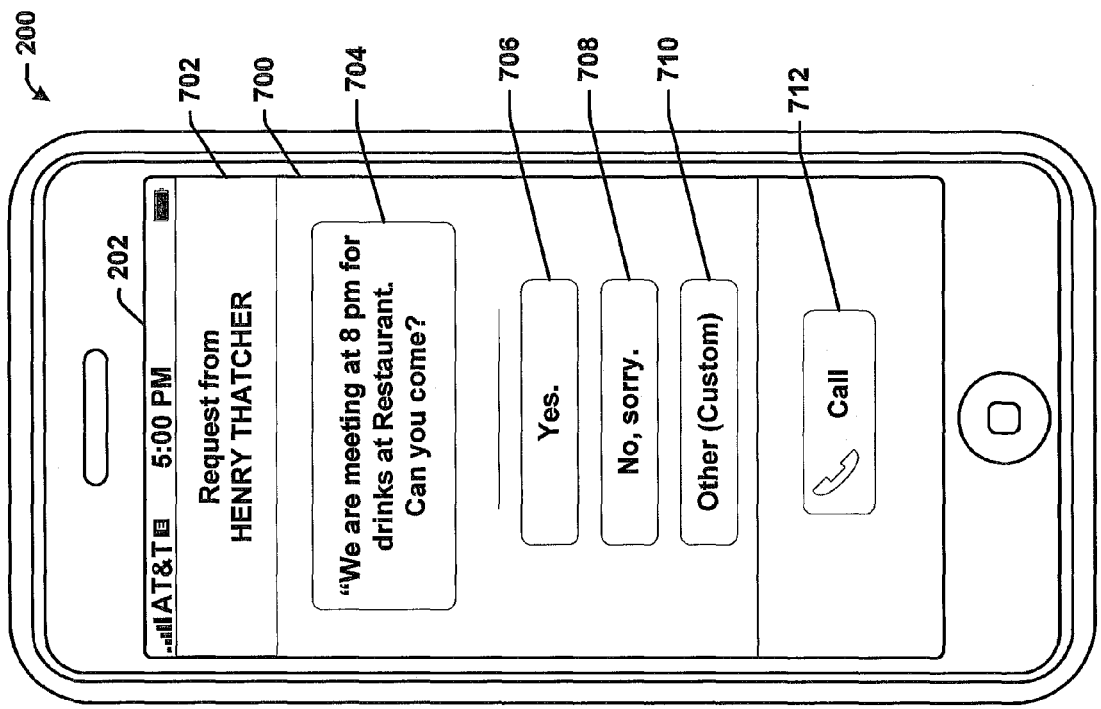
FIG. 7 illustrates an exemplary graphical user interface (GUI) screen for responding to a request message, according to an exemplary embodiment of the present disclosure.

Referring now to FIG. 7, an exemplary GUI screen 700 for responding to a request message is illustrated, according to an exemplary embodiment of the present disclosure. The GUI screen 700 is illustrated on the display 202 of the exemplary device 200. In the context of this example, the device 200 is a sender device, such as the sender device 106.

The illustrated GUI screen 700 includes a status portion 702, a message body 704, a first response option 706, a second response option 708, a third response option 710, and a call option 712. The status portion 702 currently shows that a message has been received from a calling party, Henry Thatcher. The message body 704 currently shows the message sent from Henry Thatcher with a question of whether or not the called party can come to a restaurant at the specified time. Accordingly, the first response option 706 is associated with a positive "Yes" response and the second response option 708 is associated with a negative "No" response. The third response option 710 provides a custom response that can be input by the called party. The call option 712 allows the called party to call the calling party or send a message outside of the available responses or custom response, for example.

Figure 8:
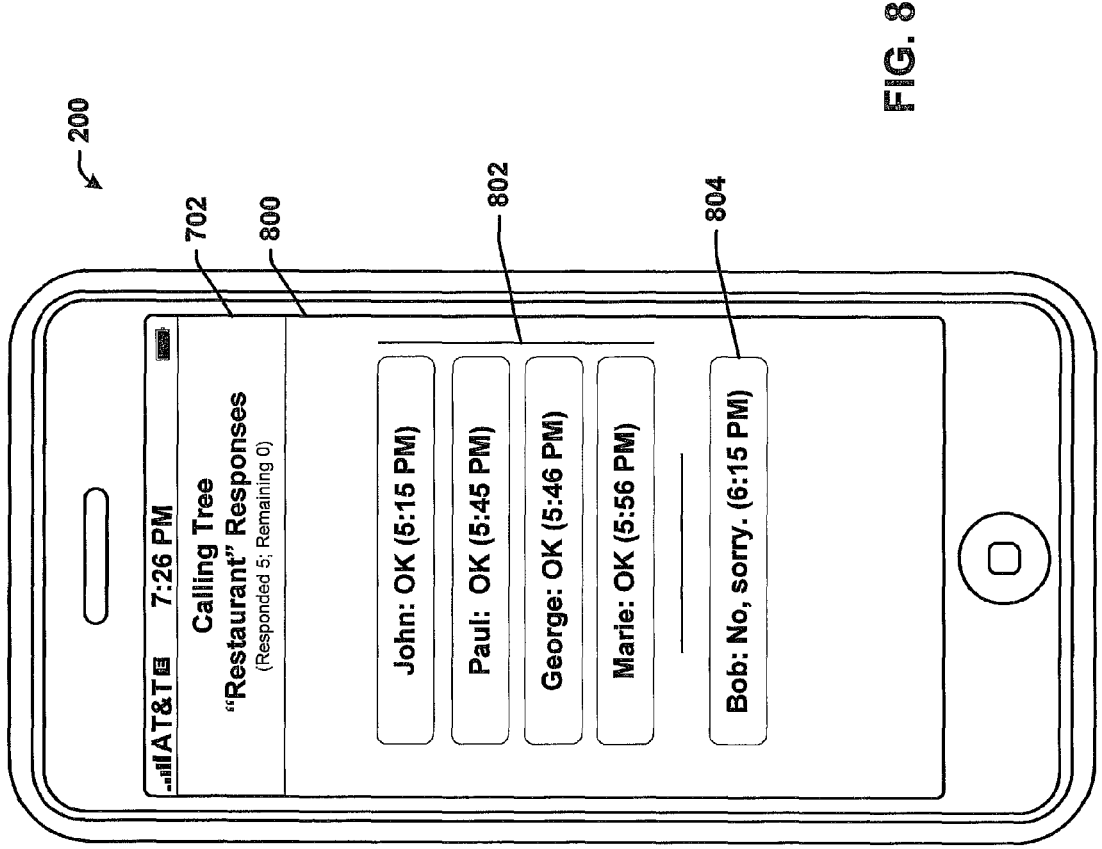
FIG. 8 illustrates an exemplary GUI screen for presenting a response list, according to an exemplary embodiment of the present disclosure.

Referring now to FIG. 8, an exemplary GUI screen 800 for presenting a response list is illustrated, according to an exemplary embodiment of the present disclosure. The GUI screen 800 is illustrated on display 202 of the exemplary device 200. In the context of this example, device 200 is a receiver device, such as receiver device 110.

The illustrated GUI screen 800 includes a status portion 702, a positive response portion 802, and a negative response portion 804. The status portion 702 currently shows an indication as to which message the current view relates. In the illustrated example, the status portion 702 indicates that the current view is a calling tree view for the "Restaurant" message and notes the number of recipients that have responded and the number of recipients remaining that have not responded. The positive response portion 802 currently shows a group of recipients that responded using the first response option 706. The responses are shown in ascending chronological order. It should be understood, however, that the order shown in any order, such as, but not limited to, descending, alphabetical, or random, for example. The negative response portion 804 currently shows a single recipient that responded using the second response option 708. The responses can be grouped in any alternative way.

Figure 9:
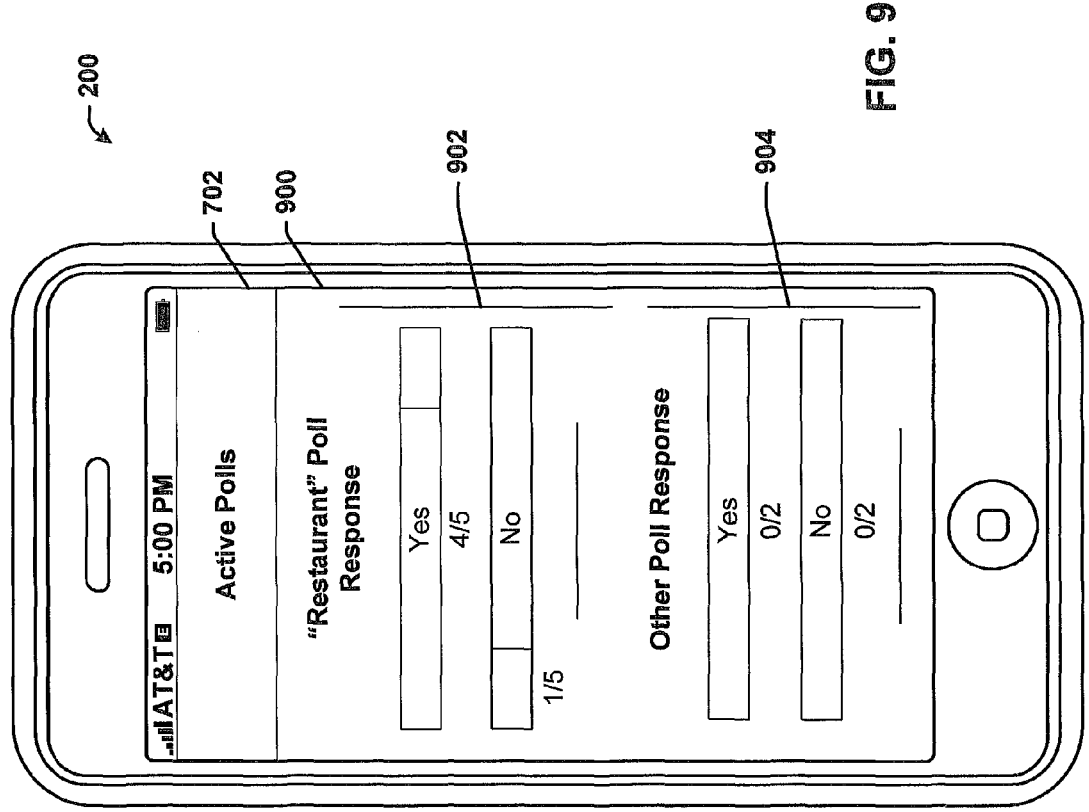
FIG. 9 illustrates an exemplary GUI screen for presenting a poll view of a group of responses, according to an exemplary embodiment of the present disclosure.

Referring now to FIG. 9, an exemplary GUI screen 900 for presenting a poll view of a group of responses is illustrated, according to an exemplary embodiment of the present disclosure. In one embodiment of the present disclosure, a group of responses can be presented using a poll view as illustrated. In the illustrated example, the status portion 702 indicates that the current view is a poll view of active polls. A first poll response portion 902 includes an indication as to which message the poll corresponds, a graphical representation of the responses to the first response option 706 and a graphical representation of the responses to the second response option 708. A graphical representation of the responses to the third response option 710 is not illustrated, but is contemplated. A second poll response portion 904 is also illustrated.

Figure 10:
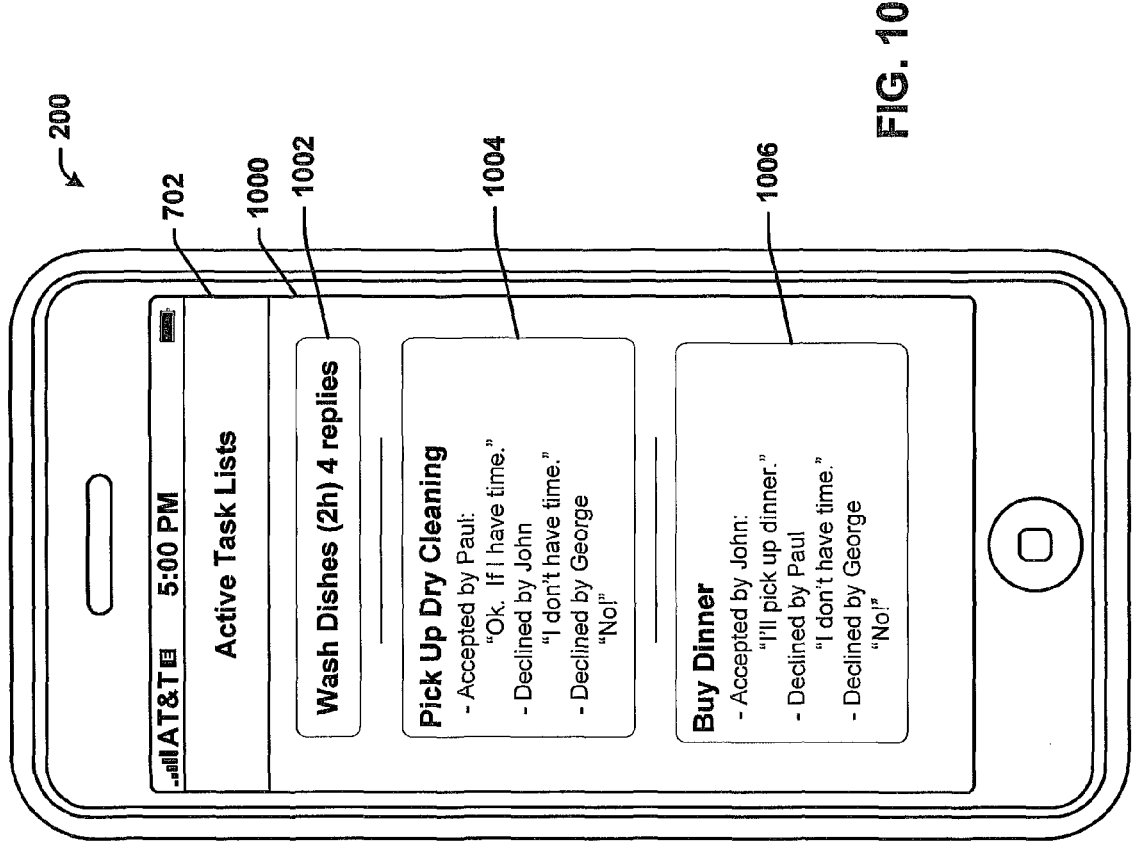
FIG. 10 illustrates an exemplary GUI screen for presenting a task view of a group of responses, according to an exemplary embodiment of the present disclosure.

Referring now to FIG. 10, an exemplary GUI screen 1000 for presenting a task view of a group of responses is illustrated, according to an exemplary embodiment of the present disclosure. In one embodiment of the present disclosure, a group of responses can be presented using a task list view as illustrated. The task list view can be used, for example, when a message is sent to a group of recipients requesting the recipients to accept or decline a task. In the illustrated example, the status portion 702 indicates that the current view is a task list view of active tasks. A first task list 1002 includes an indication as to which message the task list corresponds, a time lapse notation, and the number of replies received for the task. The first task list 1002 is illustrated as being in a minimized state. As such, in a minimized state, the details on the replies are not presented. A second task list 1004 includes an indication as to which message the task list corresponds and an expanded view of three replies listing positive and negative responses. A third task list 1006 is also illustrated.

The law does not require and it is economically prohibitive to illustrate and teach every possible embodiment of the present claims. Hence, the above-described embodiments are merely exemplary illustrations of implementations set forth for a clear understanding of the principles of the application. Variations, modifications, and combinations may be made to the above-described embodiments without departing from the scope of the claims. All such variations, modifications, and combinations are included herein by the scope of this disclosure and the following claims.

What is claimed is:

1. A method comprising:
generating, by a sender device comprising a processor, a group message directed to a group of receiver devices, the group message comprising a short message service message that comprises text that identifies a task, and a request for each receiver device of the group of receiver devices to accept or decline the task that is identified by the text;
sending, by the sender device, the group message via a short message service center to the group of receiver devices, wherein each receiver device of the group of receiver devices analyzes the text of the short message service message using text recognition logic that recognizes words in the text, word usage associated with the words, and sentence structure associated with the text to determine a first plurality of responses to be presented, the first plurality of responses comprising a first option to accept the task, a second option to decline the task, and a third option to present a custom field in which to enter a custom response;
receiving, by the sender device and from the group of receiver devices, a second plurality of responses to the group message, each response of the second plurality of responses comprising one response selected from a group of responses comprising accepting the task, declining the task, and the custom response; and
generating, by the sender device, a graphical user interface that comprises a task list view that identifies the task, the task list view comprising a first indication of a number of the second plurality of responses received from the group of receiver devices and response text for each of the second plurality of responses, wherein the task list view is presented in a minimized state that comprises the first indication of the number of the second plurality of responses, wherein details of the second plurality of responses are not presented in the task list view in the minimized state, wherein the task list view is expanded from the minimized state to an expanded state when the sender device receives an input to expand the task list view from the minimized state to the expanded state, and wherein the expanded state comprises the response text for each of the second plurality of responses.

2. The method of claim 1, wherein generating, by the sender device, the task list view comprises generating, by the sender device, the task list view identifying another task for which another group message was sent.

3. The method of claim 1, further comprising presenting a poll view of the second plurality of responses, the poll view comprising a first graphical representation indicating a number of acceptances of the task comprised within the second plurality of responses and a second graphical representation indicating a number of declinations of the task comprised within the second plurality of responses.

4. The method of claim 1, wherein the minimized state further comprises a time lapse notation indicating a time at which the group message was sent to the group of receiver devices.

5. The method of claim 1, wherein the text of the short message service message comprises a plurality of special characters, and wherein the plurality of special characters define, in a body of the group message, two responses of the first plurality of responses.

6. The method of claim 1, wherein sending the group message comprises sending the group message to an application server that
generates a web page comprising a body of the group message and options associated with the first plurality of responses, and
sends a link to the web page to the group of receiver devices as part of the short message service message.

7. The method of claim 6, wherein the group of receiver devices generate the second plurality of responses by accessing the web page.

8. A method comprising:
generating, by a first device comprising a processor, a group message directed to a group of devices, the group message comprising a short message service message that comprises text that identifies a task, and a request for each device of the group of devices to accept or decline the task that is identified by the text;
sending, by the first device, the group message via a short message service center to the group of devices, wherein each device of the group of devices analyzes the text of the short message service message using text recognition logic that recognizes words in the text, word usage associated with the words, and sentence structure associated with the text to determine a first plurality of responses to be presented, the first plurality of responses comprising a first option to accept the task, a second option to decline the task, and a third option to present a custom field in which to enter a custom response;
receiving, by the first device and from the group of devices, a second plurality of responses to the group message, each response of the second plurality of responses comprising one response selected from a group of responses comprising accepting the task, declining the task, and the custom response; and
generating, by the first device, a graphical user interface that comprises a task list view that identifies the task, the task list view comprising a first indication of a number of the second plurality of responses received from the group of devices and response text for each of the second plurality of responses, wherein the task list view is presented in a minimized state that comprises the first indication of the number of the second plurality of responses, wherein details of the second plurality of responses are not presented in the task list view in the minimized state, wherein the task list view is expanded from the minimized state to an expanded state when the first device receives an input to expand the task list view from the minimized state to the expanded state, and wherein the expanded state comprises the response text for each of the second plurality of responses.

9. The method of claim 8, wherein the text of the short message service message comprises a plurality of special characters, and wherein the plurality of special characters define, in a body of the group message, two responses of the first plurality of responses.

10. A device comprising:
a display;
a processor; and
a memory comprising instructions that, when executed by the processor, cause the processor to perform operations comprising
generating a group message directed to a group of devices, the group message comprising a short message service message that comprises text that identifies a task, and a request for each device of the group of devices to accept or decline the task that is identified by the text,
sending, to the group of devices, the group message via a short message service center, wherein each device of the group of devices analyzes the text of the short message service message using text recognition logic that recognizes words in the text, word usage associated with the words, and sentence structure associated with the text to determine a first plurality of responses to be presented, the first plurality of responses comprising a first option to accept the task, a second option to decline the task, and a third option to present a custom field in which to enter a custom response,
receiving, from the group of devices, a second plurality of responses to the group message, each response of the second plurality of responses comprising one response selected from a group of responses comprising accepting the task, declining the task, and the custom response, and
generating a graphical user interface that comprises a task list view that identifies the task, the task list view comprising a first indication of a number of the second plurality of responses received from the group of devices and response text for each of the second plurality of responses, wherein the task list view is presented on the display in a minimized state that comprises the first indication of the number of the second plurality of responses, wherein details of the second plurality of responses are not presented in the task list view in the minimized state, wherein the task list view is expanded from the minimized state to an expanded state an input is received to expand the task list view from the minimized state to the expanded state, and wherein the expanded state comprises the response text for each of the second plurality of responses.

11. The device of claim 10, wherein the minimized state further comprises a time lapse notation indicating a time at which the group message was sent to the group of devices.

12. The device of claim 10, wherein generating the task list view comprises generating the task list view identifying another task for which another group message was sent.

13. The device of claim 10, further comprising presenting, on the display, a poll view of the second plurality of responses, the poll view comprising a first graphical representation indicating a number of acceptances of the task comprised within the second plurality of responses and a second graphical representation indicating a number of declinations of the task comprised within the second plurality of responses.

14. The device of claim 10, wherein the text of the short message service message comprises a plurality of special characters, and wherein the plurality of special characters define, in a body of the group message, two responses of the first plurality of responses.

* * * * *